United States Patent
Tsukada et al.

(10) Patent No.: US 11,607,868 B2
(45) Date of Patent: Mar. 21, 2023

(54) RATCHET STACK

(71) Applicant: Polyplastics Co., Ltd., Tokyo (JP)

(72) Inventors: Takuhei Tsukada, Shizuoka (JP); Akihiro Mochizuki, Shizuoka (JP)

(73) Assignee: POLYPLASTICS CO., LTD., Tokyo (JP)

(*) Notice: Subject to any disclaimer, the term of this patent is extended or adjusted under 35 U.S.C. 154(b) by 0 days.

(21) Appl. No.: 17/262,880

(22) PCT Filed: Aug. 9, 2019

(86) PCT No.: PCT/JP2019/031636
§ 371 (c)(1),
(2) Date: Jan. 25, 2021

(87) PCT Pub. No.: WO2020/036141
PCT Pub. Date: Feb. 20, 2020

(65) Prior Publication Data
US 2021/0162714 A1    Jun. 3, 2021

(30) Foreign Application Priority Data
Aug. 13, 2018   (JP) .............................. JP2018-152268

(51) Int. Cl.
B32B 15/08     (2006.01)
B32B 3/30      (2006.01)
B32B 7/027     (2019.01)

(52) U.S. Cl.
CPC ............... *B32B 15/08* (2013.01); *B32B 3/30* (2013.01); *B32B 7/027* (2019.01); *B32B 2260/046* (2013.01)

(58) Field of Classification Search
None
See application file for complete search history.

(56) References Cited

U.S. PATENT DOCUMENTS

| | | | | |
|---|---|---|---|---|
| 5,690,224 A | * | 11/1997 | Koizumi | G11B 23/0233 206/387.1 |
| 6,042,919 A | * | 3/2000 | Gorsuch | G11B 7/258 |
| 6,457,856 B1 | | 10/2002 | Phillips | |
| 2006/0257624 A1 | | 11/2006 | Naritomi et al. | |
| 2008/0305293 A1 | * | 12/2008 | Shinkai | G11B 7/258 428/64.4 |
| 2013/0098028 A1 | | 4/2013 | Stretch | |

(Continued)

FOREIGN PATENT DOCUMENTS

| | | | | |
|---|---|---|---|---|
| FR | 2874814 A1 | * | 3/2006 | ............. A61F 2/447 |
| JP | H 06-341371 A | | 12/1994 | |

(Continued)

OTHER PUBLICATIONS

MakeItFrom.com, Mar. 17, 2022, pp. 1-4, https://www.makeitfrom.com/compare/Grade-5-Ti-6Al-4V-3.7165-R56400-Titanium/Polyetheretherketone-PEEK (Year: 2022).*

*Primary Examiner* — Tamra L. Dicus
(74) *Attorney, Agent, or Firm* — Knobbe, Martens, Olson & Bear LLP

(57) ABSTRACT

A structure capable of leaving a repetition of heating and cooling as a dynamic deformation amount. The structure retains joining performance of a laminated body made of two types of materials having different thermal properties.

1 Claim, 7 Drawing Sheets

(56) References Cited

U.S. PATENT DOCUMENTS

| | | | |
|---|---|---|---|
| 2014/0163664 A1* | 6/2014 | Goldsmith | A61B 17/0057 604/93.01 |
| 2017/0266859 A1* | 9/2017 | Neerincx | B29C 45/1635 |
| 2019/0079446 A1* | 3/2019 | Zensai | G03G 15/5008 |

FOREIGN PATENT DOCUMENTS

| | | |
|---|---|---|
| JP | H 10-138380 A | 5/1998 |
| JP | 2007-268940 A | 10/2007 |
| JP | 2018-111277 A | 7/2018 |
| WO | WO 2004/041533 A1 | 5/2004 |
| WO | WO 2013/058401 A1 | 4/2013 |

\* cited by examiner (A)
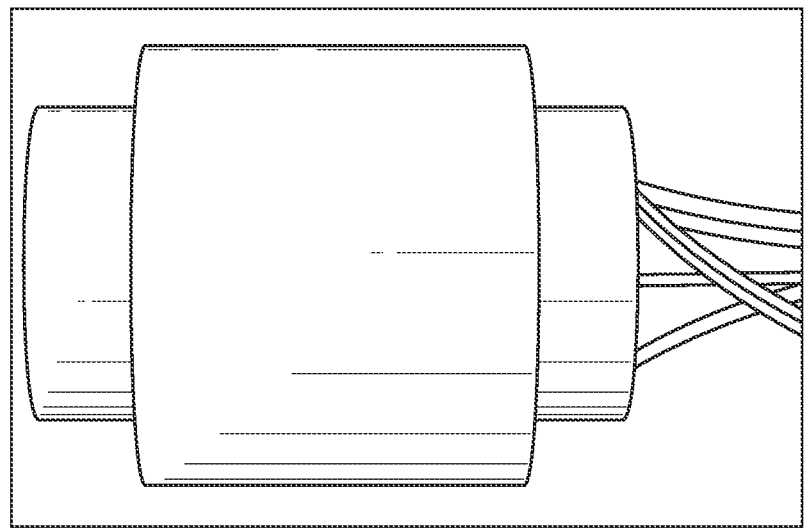
(B)
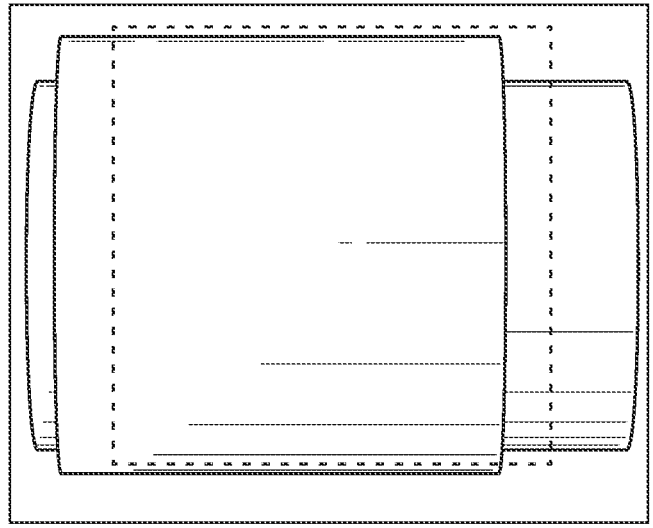
FIG. 4

GATE

RATCHET STACK

TECHNICAL FIELD

The present invention relates to a stack of two materials with different thermal expansion coefficients having a ratchet structure at the interface between the two materials.

BACKGROUND ART

A bimetallic strip is a stack of two materials with different thermal expansion coefficients, which is well known in the art as an element for converting thermal changes into mechanical changes. A bimetallic strip, which is used in various fields such as switching, is designed to utilize temperature-dependent changes in the degree of bending of the stack. When a bimetallic strip is cooled after being heated, the stack returns to the original shape as the temperature returns to the original level, so that the thermal change during the heating-cooling process is not stored as a mechanical change in shape.

DISCLOSURE OF THE INVENTION

Problems to be Solved by the Invention

The present inventors have found a structure capable of storing repeated cycles of heating and cooling as a mechanical change in shape.

Means for Solving the Problems

An object of the present invention is achieved by the following aspects.

1. A stack comprising two members with different thermal expansion coefficients, the two members including a first member and a second member being on each other, the stack having a ratchet structure at an interface between the first member and the second member, wherein the first member has a thermal expansion coefficient greater than that of the second member.

2. The stack according to aspect 1, wherein the ratchet structure satisfies formulas 1 to 3 below. Formula 1 for conditions for movement in the in-plane direction:

$$l > \frac{p}{(\alpha_{LD} - \alpha_2) \times \Delta T} \quad \text{[Math 1]}$$

Formula 2 for conditions for movement in the thickness direction:

$$h > \frac{t}{(\alpha_{TD} - \alpha_2) \times \Delta T} \quad \text{[Math 2]}$$

Formula. 3 for locking conditions:

$$\theta_F > \theta_B \, p_1 = t \times \tan \theta_F \, p_2 = t \times \tan \theta_B \, p = p_1 + p_2 \quad \text{[Math 3]}$$

In the formulas, each symbol means as follows.

[Math 4]

the entire length of the first member $l$ thickness of the first member $h$

[Math 5]

the thermal expansion coefficient in the in-plane direction of the first member $\alpha_{LD}$ the thermal expansion coefficient in the thickness direction of the first member $\alpha_{TD}$ the thermal expansion coefficient of the second member $\alpha_2$ [Math 6]

the amount of change in temperature $\Delta T$ forward angle $\theta_F$ backward angle $\theta_B$ [Math 7]

the length of projection of a movable-side inclined surface of resin (the first member)

$p_1$ the length of projection of a lockable-side inclined surface of resin (the first member)

$p_2$ [Math 8]

the working pitch in a micro ratchet structure $p$ the working depth in a micro ratchet structure $t$ 3. The stack according to aspect 1 or 2, wherein the first member comprises a resin, and the second member comprises a metal.

Effects of the Invention

The present invention makes it possible to store repeated cycles of heating and cooling as a mechanical change in shape. Moreover, the change in shape can be stored in the form of stress, namely, dynamic quantity.

BRIEF DESCRIPTION OF THE DRAWINGS

FIGS. 4(A) and 4(B) are photographs showing actual movement of the resin-metal stack shown in FIGS. 3(A) and 3(B);

PREFERRED MODE FOR CARRYING OUT THE INVENTION

Hereinafter, the present invention will be described in detail.

<Stack>

The stack according to the present invention includes two members, a first member and a second member, having different thermal expansion coefficients. The stack according to the present invention has a rachet structure at the interface between the first and second members being on each other.

<<Two Materials With Different Thermal Expansion Coefficients>>

As used herein, the term "thermal expansion coefficient" refers to a linear expansion coefficient per 1 K ($\times 10^{-6}$/K) at a temperature of 23° C. to 55° C. In the present invention, materials with a thermal expansion coefficient of 10 or more are preferably used. The present invention can bring about advantageous effects as long as the two materials (first and second members) have different thermal expansion coefficients. Practically, the difference between the thermal expansion coefficients of the two materials may be 5 to 250 ($\times 10^{-6}$/K), and preferably 20 to 200 ($\times 10^{-6}$/K).

Examples of the resin include those having a thermal expansion coefficient of 60 to 250 ($\times 10^{-6}$/K), such as polyethylene, polypropylene, nylon 6, acrylonitrile butadiene styrene (ABS) resin, polycarbonate, polyacetal, polyethylene terephthalate, polybutylene terephthalate, polyphenylene sulfide, liquid crystal polymer, and cycloolefin polymer. The resin may contain an inorganic filler for adjusting the thermal expansion coefficient.

Examples of the metal include those having a thermal expansion coefficient of 4 to 50 ($\times 10^{-6}$/K), such as aluminum, chromium, titanium, iron, nickel, brass, copper, and alloys thereof such as stainless steel.

Examples of inorganic materials other than metal include those having a thermal expansion coefficient of 3 to 15 ($\times 10^{-6}$/K), such as glass and ceramics. Examples of materials other than the above include composite materials such as carbon fiber reinforced plastics (CFRP) and glass fiber reinforced plastics (GFRP). For such composite materials, the fiber content or the fiber orientation angle may be adjusted for adjustment of the thermal expansion coefficient.

Examples of the combination of the two materials include a combination of resins, a combination of metals, a combination of a resin and a metal, a combination of a resin and a ceramic, and a combination of a resin and a composite material, which may be selected as appropriate. Among them, a combination of a resin and a metal is preferred.

<<Ratchet Structure at Interface>>

Figure 1:
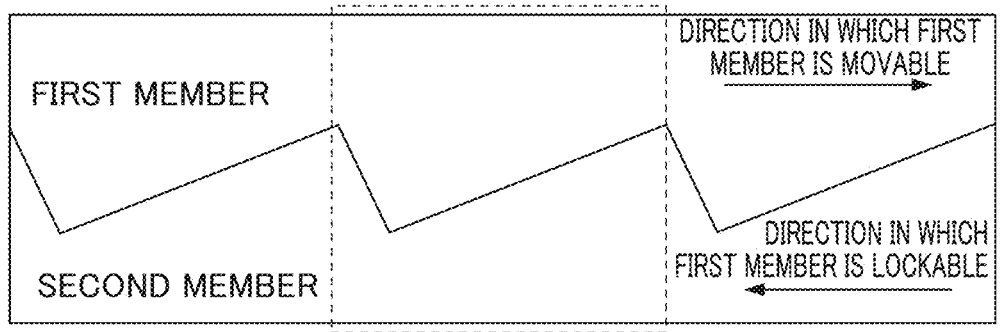
FIG. 1 is a cross-sectional diagram of an insert-molded product having a ratchet function according to the present invention, in which a second member is fixed.

In the ratchet structure at the interface between the two members of the stack according to the present invention, the first member and the second member play roles like a gear and a ratchet respectively (see FIG. 1). Examples of the ratchet structure also include a shark skin riblet structure, a saw blade structure, a scale structure, and other structures.

Figure 2:
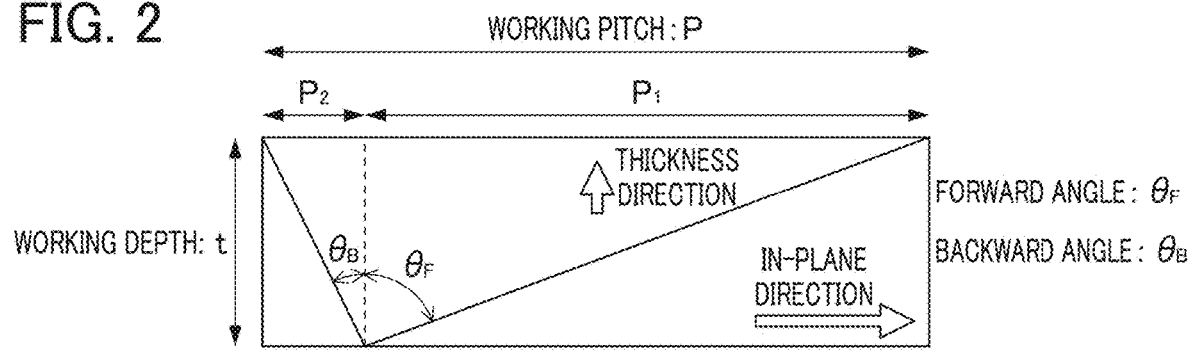
FIG. 2 is a diagram showing the definition of forward angle and backward angle for the formula regarding the ratchet structure according to the present invention.
Figure 3:
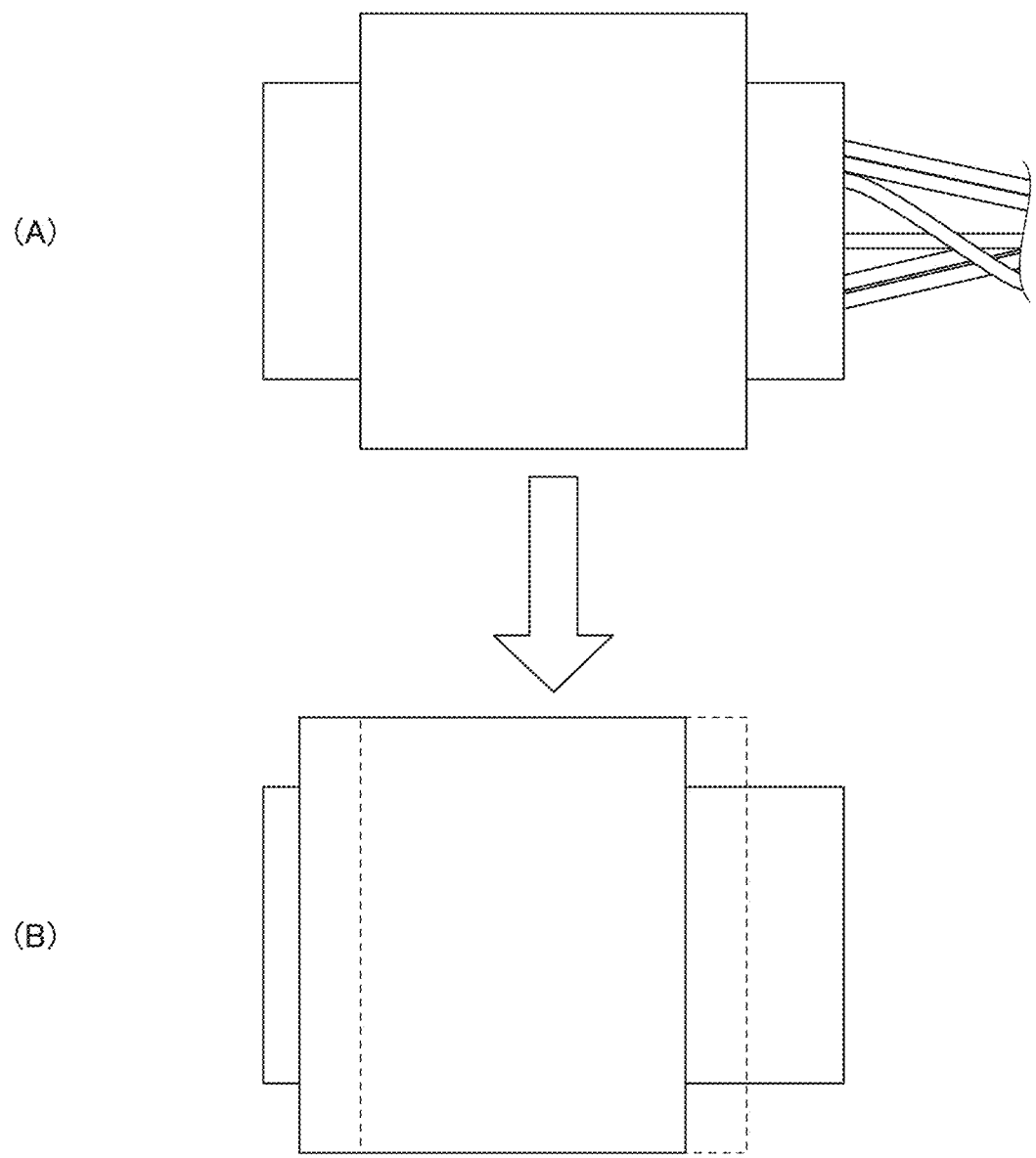
FIGS. 3(A) and 3(B) are schematic diagrams showing movement of a resin-metal stack having a ratchet structure according to the present invention.

In present invention, the ratchet structure preferably satisfies formulas 1, 2, and 3 below as illustrated in FIG. 2. Formula 1 for conditions for movement in the thickness direction:

$$h > \frac{t}{(\alpha_{TD} - \alpha_2) \times \Delta T} \quad [\text{Math 9}]$$

Formula 2 for conditions for movement in the in-plane direction:

$$l > \frac{p}{(\alpha_{LD} - \alpha_2) \times \Delta T} \quad [\text{Math 10}]$$

Formula 3 for locking conditions:

$$\theta_F > \theta_B\, p_1 = t \times \tan \theta_F\ p_2 = t \times \tan \theta_B\ p = p_1 + p_2 \quad [\text{Math 11}]$$

In the formulas, each symbol means as follows.

[Math 12]

the entire length of the first member $l$ the thickness of the first member $h$ [Math 13]

the thermal expansion coefficient in the in-plane direction of the first member $\alpha_{LD}$ the thermal expansion coefficient in the thickness direction of the first member $\alpha_{TD}$ the thermal expansion coefficient of the second member $\alpha_2$ [Math 14]

the amount of change in temperature $\Delta T$ forward angle $\theta_F$ backward angle $\theta_B$ [Math 15]

the length of projection of a movable-side inclined surface of resin (the first member)

$p_1$ the length of projection of a lockable-side inclined surface of resin (the first member)

$p_2$ [Math 16]

the working pitch in a micro ratchet structure $p$ the working depth in a micro ratchet structure $t$ Formula 1 defines conditions for movement in the thickness direction. Formula 2 defines conditions for movement in the in-plane direction, specifically, in the in-plane longitudinal direction. Formula 3 defines conditions for preventing return to the original state during cooling after heating.

In the present invention, thermal expansion and contraction should occur within the range of elastic deformation. During expansion (in the thickness and in-plane directions) of the whole of the first member with a greater thermal expansion coefficient, locking should be established if at least one of all in-plane pitches of the stack meshes with a portion different from the original portion of the micro ratchet structure. The stack satisfying formulas 1 to 3 can store repeated cycles of heating and cooling as a mechanical change in shape.

Referring to FIG. 1 showing an example of the stack, heating and cooling generate forces to the two materials in the directions of the arrows. If the first member and the second member are both thermally expanded by heating to be deformed in an amount exceeding one unit, the ratchet will work for locking so that the original state cannot be recovered even by cooling performed thereafter for contraction.

The micro ratchet structure preferably has a working depth t equal to 0.05 to 2.3%, more preferably 0.1 to 1.0%, even more preferably 0.15 to 0.5%, and further more preferably 0.18 to 0.3% of the thickness of the first member. The actually measured value of the working depth t is preferably 1 to 160 μm, more preferably 2 to 100 μm, even more preferably 3 to 50 μm, and further more preferably 5 to 20 μm. The first member preferably has a thickness h of 1 to 10 mm, more preferably 1.5 to 8 mm, and even more preferably 2 to 6 mm.

>>Shape of the Stack>>

The stack according to the present invention may have any shape. The shape of the stack may be such that the two members are both desired molded articles, such as sheets, or such that one of them is a cylinder and the other has a shape provided around the cylinder.

Embodiments

Figure 5:
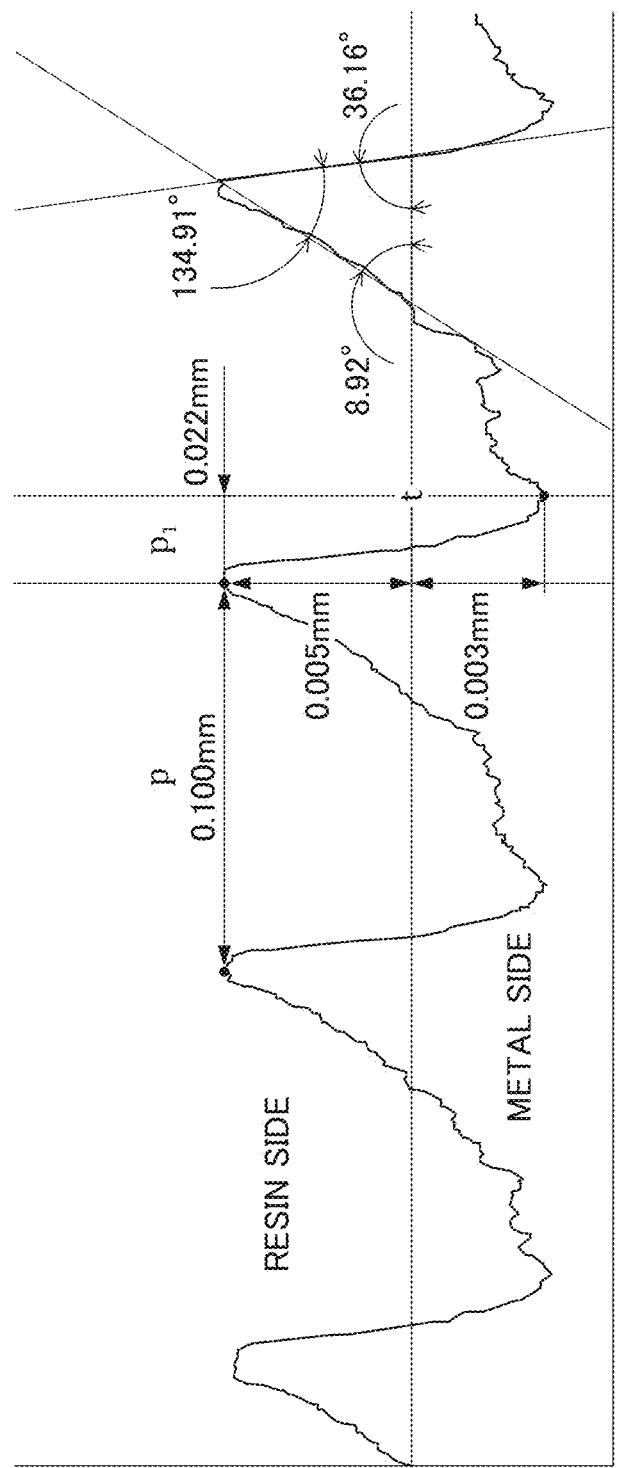
FIG. 5 is a diagram showing an actually measured shape of the ratchet structure of the stack shown in FIGS. 4(A) and 4(B)

FIGS. 3(A), 3(B), 4(A), and 4(B) show an example of an insert-molded resin product, which includes a metal cylinder and a polyacetal resin molded product provided around the cylinder. The metal has a thermal expansion coefficient greater than that of the resin. The metal cylinder has ratchets as shown in FIG. 1. The resin layer is formed by insert molding on the ratchet structure. As the stack was repeatedly heated and cooled, the resin layer portion moved from the position shown in FIG. 3(A) to the position shown in FIG. 3(B), in which the original position is indicated by the dotted line. FIGS. 4(A) and 4(B) are photographs showing the actual movement. FIG. 5 shows the specific size of each member.

Figure 6:
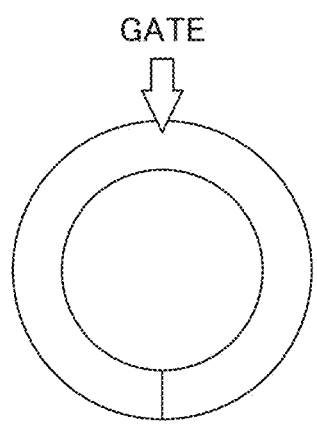
FIG. 6 is a diagram showing an example of a ratchet structure according to the present invention formed by injection molding.

FIG. 6 shows another embodiment of the present invention, in which the ratchet structure is used at a junction of resin flows, called a weld, which is opposite to a gate through which the resin is cast. Resin flowing in different directions meets at the weld portion. Thus, the weld portion is known to be vulnerable to deformation by repeated heating and cooling since the weld portion has low resin uniformity and tends to be the starting point of cracking as it is cleaved by stress or distortion concentration.

Figure 7:
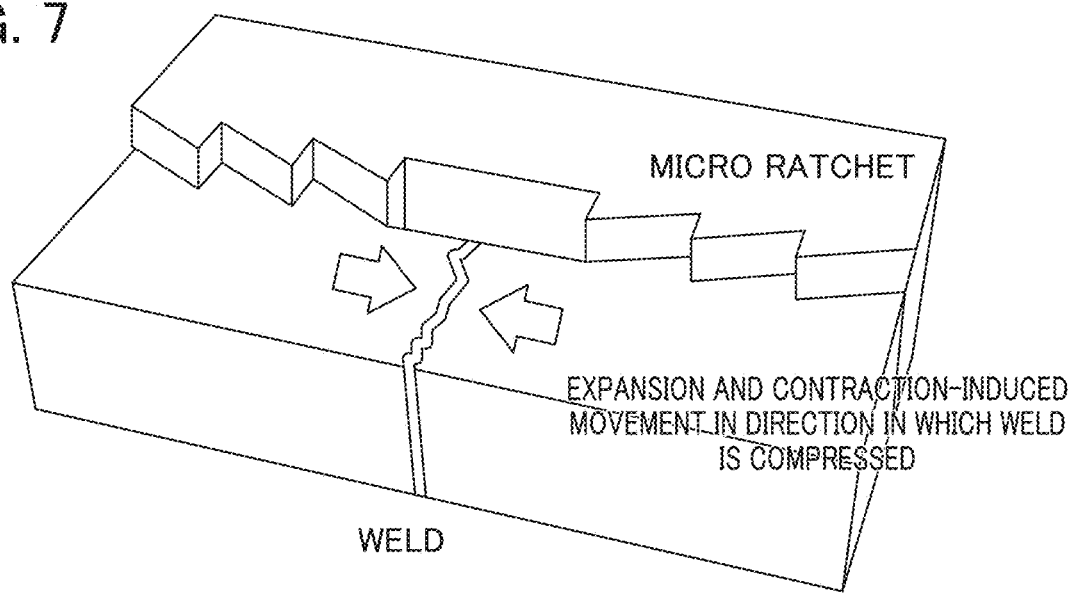
FIG. 7 is a view showing an example of a ratchet structure according to the present invention formed by injection molding.

FIG. 7 shows that a metal column has ratchets in a shape that allows the resin to deform in a direction toward the weld. When this stack is repeatedly heated and cooled, forces are applied to deform the resin in a direction toward the weld. In other words, the resin deforms in a direction in which the weld is closed, so that the junction strength at the weld increases and breaking caused by repeated heating and cooling-induced deformation becomes less likely to occur at the weld. As described above, the present invention makes it possible to convert thermal energy from repeated heating and cooling into movement (physical amounts).

The invention claimed is:

1. A stack comprising two members with different thermal expansion coefficients, the two members including a first member and a second member on each other, the stack having a ratchet structure at an interface between the first member and the second member,
wherein the first member has a thermal expansion coefficient greater than that of the second member,
wherein the first member comprises a resin, and the second member is a metal column, wherein the metal column has the ratchet structure in a shape that allows the resin to deform in a direction toward a weld that is opposite to which the resin is cast, and
wherein the ratchet structure is configured to satisfy:
formula 1 for conditions for movement in a thickness direction:

$$h > \frac{t}{(\alpha_{TD} - \alpha_2) \times \Delta T},$$

formula 2 for conditions for movement in an in-plane direction:

$$l > \frac{p}{(\alpha_{LD} - \alpha_2) \times \Delta T},$$

formula 3 for locking conditions:
$\theta_F > \theta_B$,
where $p_1 = t \times \tan \theta_F$, $p_2 = t \times \tan \theta_B$, $p = p_1 + p_2$,
wherein in the foregoing formulae:
l is entire length of the first member,
h is thickness of the first member,
$a_{LD}$ is thermal expansion coefficient in the in-plane direction of the first member,
$a_{TD}$ is thermal expansion coefficient in the thickness direction of the first member,
$a_2$ is thermal expansion coefficient of the second member,
$\Delta T$ is amount of change in temperature,
$\theta_F$ is forward angle,
$\theta_B$ is backward angle,
$p_1$ is length of projection of a movable-side inclined surface of resin (the first member),
$p_2$ is length of projection of a lockable-side inclined surface of resin (the first member),
p is working pitch in a micro ratchet structure, and
t is the working depth in a micro ratchet structure.

* * * * *